July 5, 1938.  R. J. S. CARTER  2,122,679
MULTIPLE STREAM FEEDER
Filed Sept. 2, 1936   3 Sheets-Sheet 1

INVENTOR
Robert J. S. Carter
By his Attorneys
Merchant & Kilgore

July 5, 1938.  R. J. S. CARTER  2,122,679
MULTIPLE STREAM FEEDER
Filed Sept. 2, 1936  3 Sheets-Sheet 2

INVENTOR
Robert J. S. Carter
By his Attorneys
Merchant Kilgore

July 5, 1938.  R. J. S. CARTER  2,122,679
MULTIPLE STREAM FEEDER
Filed Sept. 2, 1936  3 Sheets-Sheet 3
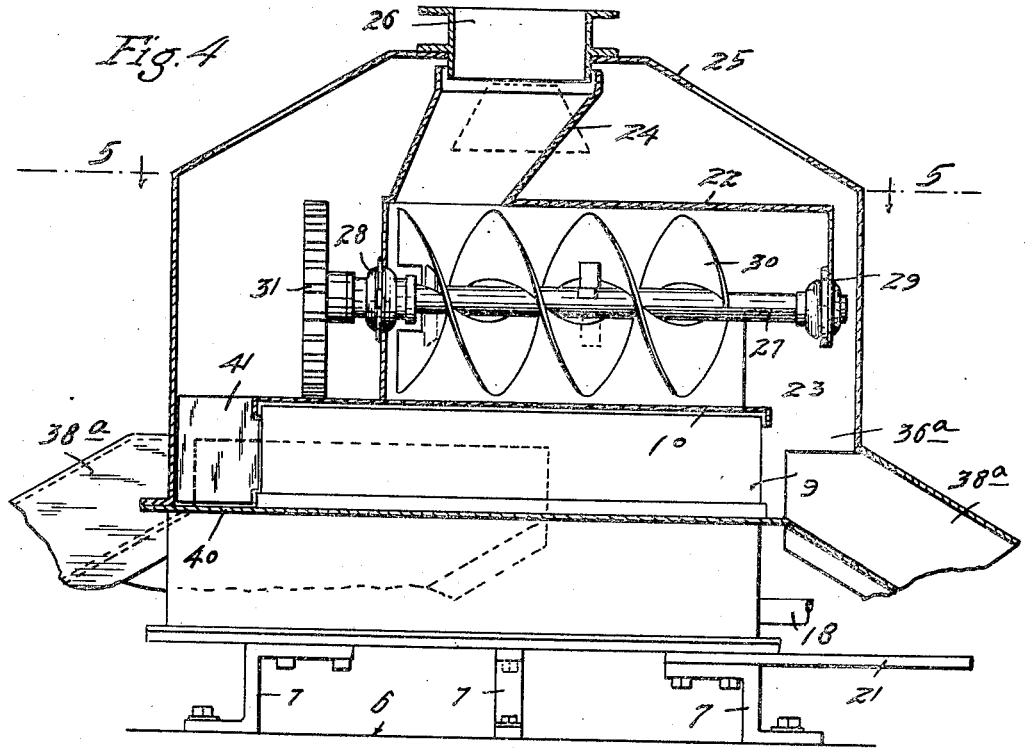
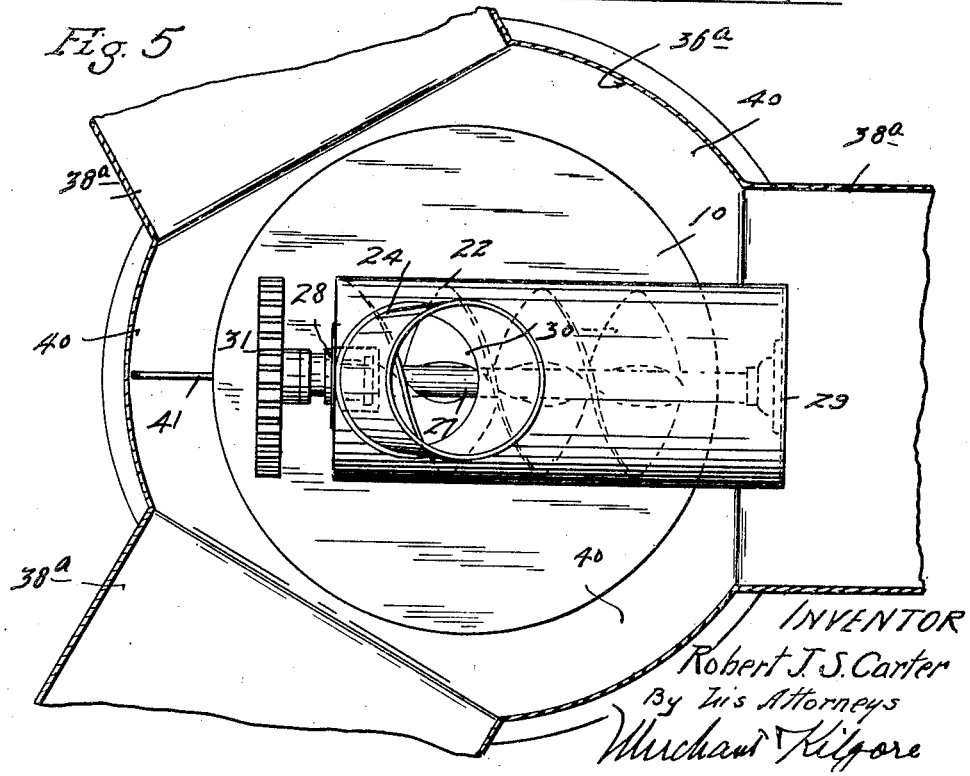
INVENTOR
Robert J. S. Carter
By his Attorneys
Michael Kilgore Patented July 5, 1938

2,122,679

UNITED STATES PATENT OFFICE 2,122,679

MULTIPLE STREAM FEEDER

Robert J. S. Carter, Minneapolis, Minn.

Application September 2, 1936, Serial No. 99,064

6 Claims. (Cl. 83—44)

My invention provides a feed device adapted to receive a single stream of grain or material and to evenly or proportionately divide and deliver the same in a plurality of streams. Devices of this kind are sometimes designated as "dividers", but for the purpose of this case, I have designated the same as a "multiple stream feeder."

A feeder of the above character will be found useful in many places and for the feeding or delivery of various different kinds of materials. In the flour mill industry, for example, they may want to divide a ground wheat stream into two, three, four, five, six or more parts; and this device is well adapted for this purpose.

The objects of the invention are simplicity of construction, reliability of action, reasonably low cost, compactness of structure, and the like.

The invention involves a rotating distributor head arranged to receive a main stream of grain or material, to divide the same evenly or on a predetermined definite plan, and deliver the respective sub-streams to a plurality of cooperating receiving spouts or receptacles.

The rotary distributing head is provided with a receiving trough equipped with a positive feed device, preferably in the form of a feed screw or spiral, the feeding action of which is definitely fixed in respect to the rotation of the head. The above and other highly important novel features of the invention will appear in the description of the drawings appended hereto and which illustrate a commercial form of my invention.

In the drawings, wherein like characters indicate like parts throughout the several views:

Fig. 4 is a view corresponding closely to Fig. 1, but with some parts in full and some of the driving mechanism being omitted, illustrating a somewhat modified form of the distributing spouts and cooperating annular distributing channel; and Fig. 5 is a view partly in horizontal section on the line 5—5 of Fig. 4, some parts being broken away and some parts being shown in full.

Figure 1:
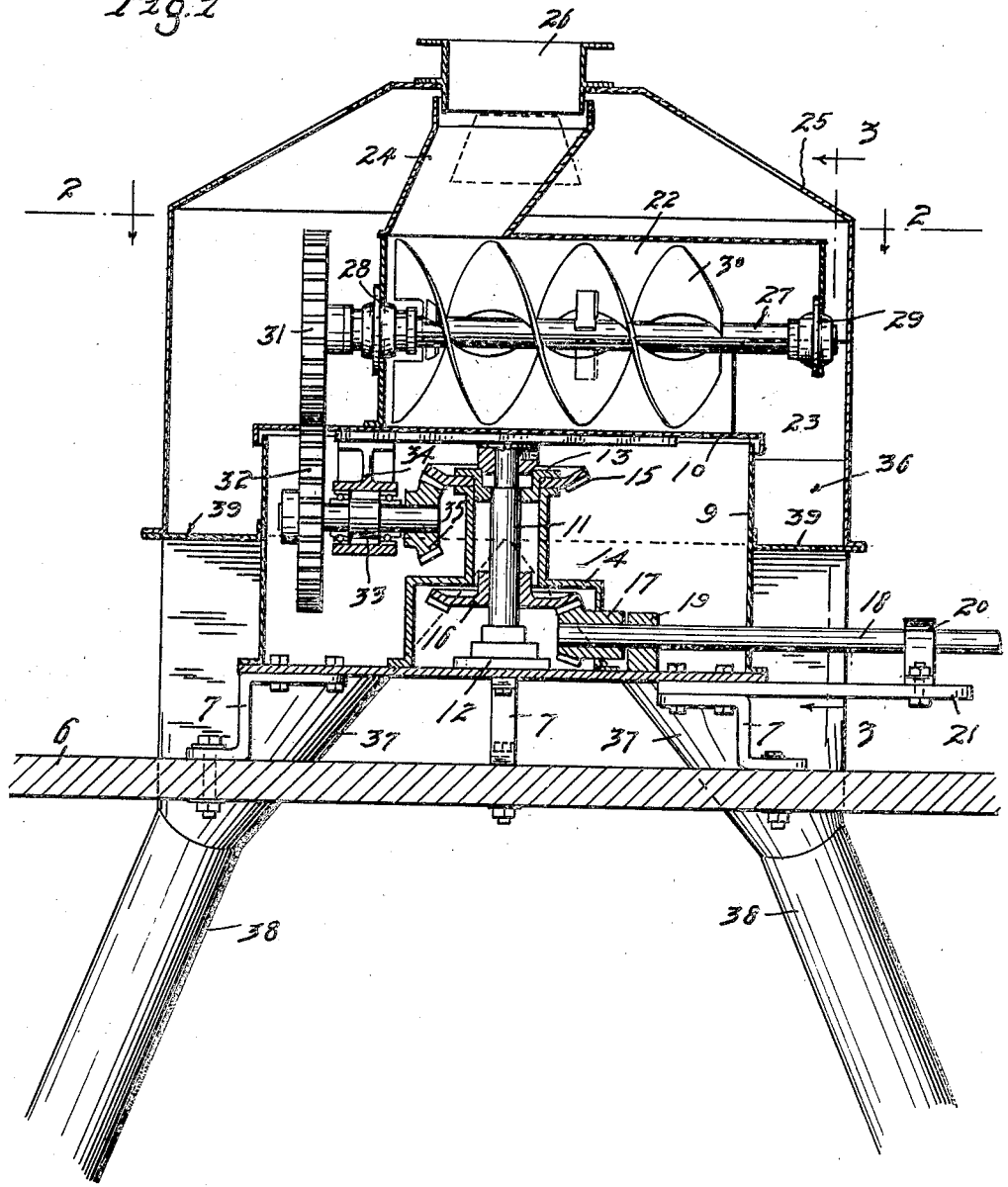
Fig. 1 is a vertical axial section taken on the line 1—1 of Fig. 2.
Figure 2:
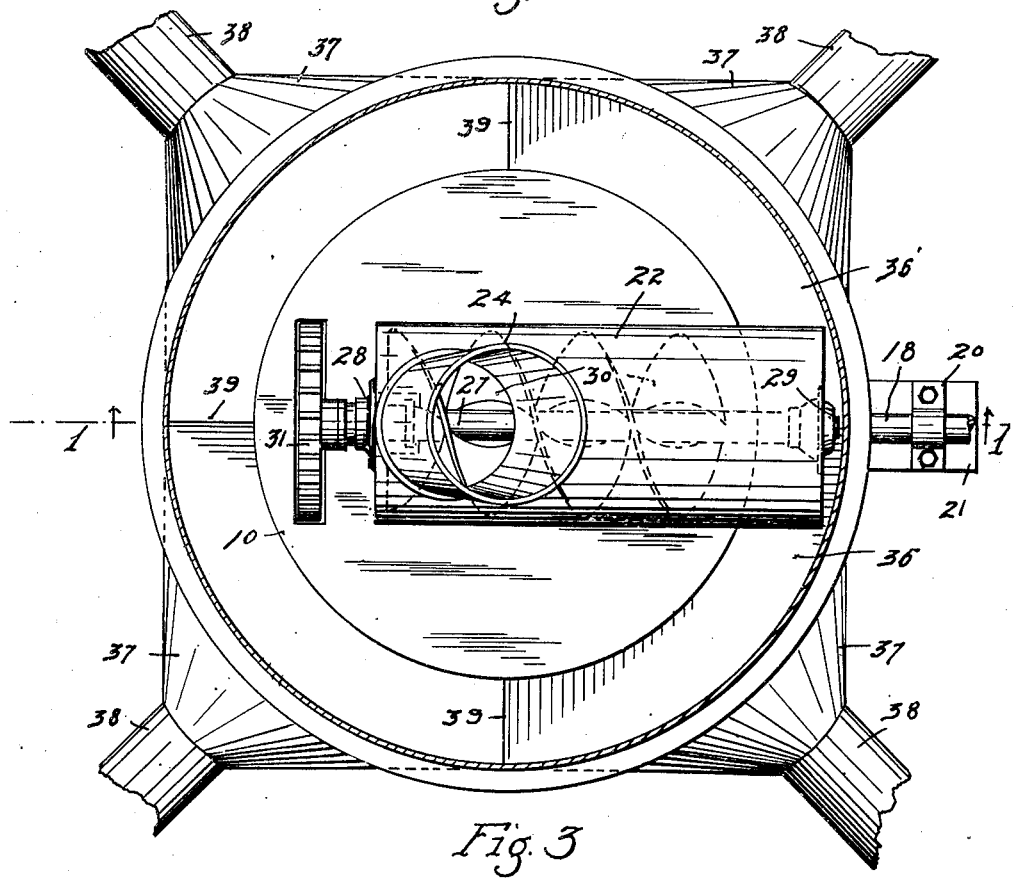
Fig. 2 is a horizontal section taken on the line 2—2 of Fig. 1.
Figure 3:
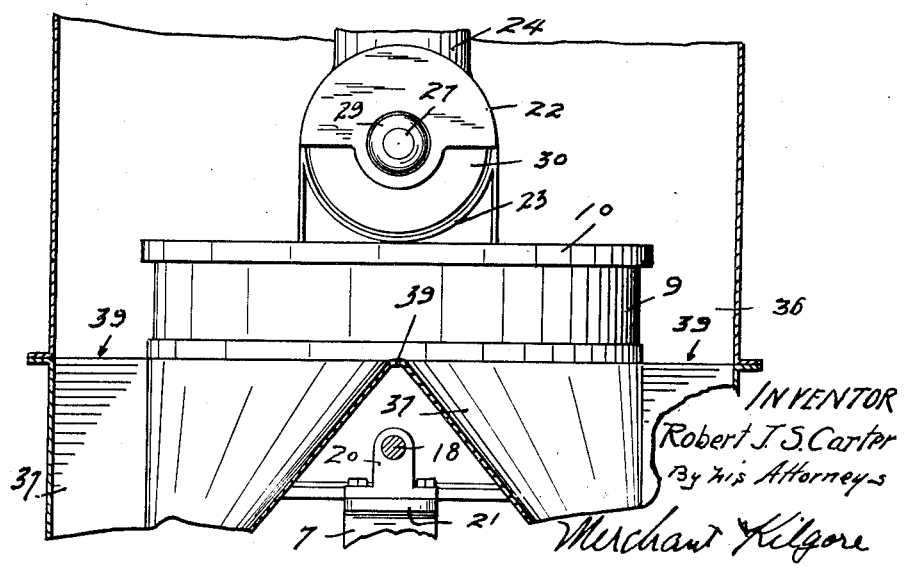
Fig. 3 is a vertical section taken on the line 3—3 of Fig. 1, some parts being broken away.

Referring first to the construction illustrated in Figs. 1, 2 and 3, numeral 6 indicates a suitable support which may be assumed to be the floor of an elevated room. On this support 6, by means of brackets 7, is supported a gear box 9 of cylindrical form. Covering the gear box is a disc-like rotary deck 10 that is fixed to the upper end of a shaft 11 located at the axis of the gear box. This shaft 11 at its lower end is journaled in a bearing 12 on the bottom of the gear box, and at its upper end it is journaled in a fixed cap 13 which, in turn, is rigidly secured to the tubular upper end of a hollow hub structure 14. The cap 13 rigidly anchors to the upper end of the hub structure a non-rotary beveled gear 15. A beveled gear 16, secured to the lower portion of the shaft 11, meshes with a beveled pinion 17 secured on the inner side of a power-driven shaft 18, is journaled in suitable bearings 19 and 20, the former of which is secured on the bottom of the gear box, and the latter of which is secured to an extended arm 21 of said box.

Secured on the rotary deck 10 is a horizontally disposed diametrically extended distributing trough 22, preferably in the form of a horizontally disposed spout that is open for discharge at 23 and is provided at its other end with a receiving spout 24. The deck 10 and its spout constitute a rotary distributing head as will presently more fully appear. This distributing head is encased or enclosed within an outer casing or hood 25, preferably formed of sheet metal, and provided in its dome-like top with a large delivery sleeve 26 adapted to receive or to form a part of the delivery device for the stream of grain or other material that is to be divided. It is important to note that this sleeve or spout end 26 is in axial alignment with the shaft 11, and hence with the axis on which the distributing head revolves. Also, it is important to note that the receiving end of the spout 24, which is telescoped around or in close association with the sleeve 26, is also in axial alignment with the shaft 11, while the delivery end of said spout 24, longitudinally of the trough 22, is diametrically opposite to the delivery opening 23 of said trough. The importance of this feature will be later noted.

Extended through the trough 22 is a horizontal shaft 27 journaled in bearings 28 and 29 on the opposite ends of the trough. This shaft 27 carries one or more spiral blades 30; and as shown, said shaft is provided with two such blades forming a two-blade spiral conveyor.

At that end which projects through the closed head of the trough 22, shaft 27 is provided with a spur-gear 31 that meshes with a spur-gear 32 secured on the outer end of a short radially disposed shaft 33. Shaft 33 is shown as journaled in a bearing bracket 34 secured to the rotary deck 10. At its inner end said shaft 33 is provided with a beveled pinion 35 that meshes with the non-rotary or fixed spur-gear 15.

It will be noted that the outer wall of the casing 25 is spaced concentrically outward of the upper portion of the cylindrical gear housing 9 and of the outer edge of the rotary deck 10 so as to form an annular receiving channel 36, the bottom of which is formed by the hopper-like upper ends 37 of circumferentially spaced depending distributing spouts 38. In the arrangement illustrated, there are four of the spouts 38 located 90° apart, and their hopper-like receiving ends 37 are joined at 39 so that substantially all of the bottom of the channel 36 is formed by the hoppers 37.

In the arrangement shown, gears 31 and 32 have the same number of teeth, and the fixed gear 15 has twice as many teeth as its intermeshing pinion 35. With this relation of driving connections, the spiral conveyor 27—30 will be given two complete rotations for each rotation of the trough carrying deck 10. 90° of rotation of deck 10 and trough 22 carries the delivery end of the trough from the axis of the one hopper 37 to the axis of the other hopper, and for each 90° of movement, each of the two spiral blades 30 of shaft 27 will discharge an amount of grain or material represented by one-half convolution of the two spiral blades. With a single spiral blade on the conveyor and with gears arranged to give the conveyor one complete rotation for each 90° of movement, substantially the same amount of discharge would be produced. In any event, for each 90° of movement, of the deck and trough, the spiral conveyor will produce a definite predetermined discharge of grain or material into each of the several hoppers, and hence, into each of the several distributing spouts. This statement assumes that the distributing spouts are evenly spaced circumferentially, that is, that there are the same number of degrees between each of the several spouts.

The deck, and hence the spout, may be rotated at quite high speed, in which event centrifugal force would have its influence on the rate of discharge of the material from the distributing trough. That material in the trough between the axis of rotation and the discharge passage 23 will tend to be discharged under the action of centrifugal force, but that portion of the grain or material delivered into the receiving end of the trough on the other side of the axis of rotation will, under the action of centrifugal force, be held back or crowded toward the closed receiving end of the trough. This is important for two reasons, to wit: in the first place, it tends to keep the receiving end of the trough filled with the grain or material; and in the second place, it holds back the discharge under the action of centrifugal force and makes the discharge from the trough dependent entirely on rotation of the spiral conveyor.

If the spout-like trough 22 could be kept completely filled with the grain or material, the discharge from the trough would be continuous and even. However, in practice, it is not practicable to keep the trough more than about half filled with the grain or material; and hence, the discharge from the spout at 23 will take place when the delivery end of a blade sweeps through the grain at or near the bottom of the trough. This produces a slight pulsation in the discharge which, however, is reduced by the provision of a plurality of blades. Nevertheless, it is desirable to so time the rotation of the spiral conveyor that one convolution of the blade between the delivery end of the conveyor will sweep through the grain and produce the discharge while the delivery end of the spout is moving past or over the hopper or receiving end of a particular spout. This feature is accomplished by the timing illustrated wherein the two-blade conveyor is provided and would be provided with a single-blade conveyor provided the conveyor were, as above suggested, driven at twice the speed produced by the gear drive illustrated.

The modification illustrated in Figs. 4 and 5 in most respects is like that previously described, and the identical parts are therefore indicated by the same numerals that are used in the description of Figs. 1, 2 and 3. In this modified arrangement, only three distributing spouts 38ᵃ are shown, and these lead from the receiving channel 36ᵃ, and the bottom of said receiving channel between the spouts is formed by flat horizontal segmental deck sections 40. In this arrangement the receiving ends of the distributing spouts 38ᵃ extend through approximately 60°, and the deck sections 40 extend each through approximately 60°. Hence, the discharge of grain or material from the distributing trough into a receiving spout 38ᵃ will take place during approximately 60° of the rotation of the distributing spout, and the discharge onto a deck section 40 will take place during approximately 60° of rotation of said spout. For co-operation with the deck sections 40, the rotary deck 10 at a point diametrically opposite to the discharge passage 23 is provided with a scraper blade 41 that moves closely to the deck sections 40.

With the structure described an equal amount of grain will be discharged into each of the several spouts, but the discharge into a particular spout will, of course, be intermittent, producing a sort of pulsation in the flow of grain through the spout. With the arrangement illustrated in Figs. 4 and 5, this pulsation is reduced by a discharge of part of the grain to a spout, while the discharge end of the trough is passing the spout, and the other part thereof will be scraped near the spout by the scraper 41. Obviously, the first half of the delivery to a particular spout will take place while the discharge end of the spout is passing the spout, and the other half will be subsequently scraped into the said spout by the blade 41 when the distributing head has moved 180°. Otherwise stated, the delivery to a spout is accomplished by two discharges that take place twice for each rotation of the distributing head. Moreover, in both of the structures above described, the discharge into a particular spout is spread over a considerable portion of the time of rotation of the distributing head, and when that time is divided as with the structure illustrated in Figs. 4 and 5, there is not much time in which there will be no flow or discharge of grain into or through to a particular spout, and hence, the discharge through a particular spout is made to approximate a continuous flow.

From the foregoing, it will be understood that the invention illustrated in the drawings and above described is capable of various modifications as to details of construction and arrangement of parts within the scope of the invention herein disclosed and claimed.

What I claim is:

1. In a device of the kind described, the combination with a cylindrical gear box and a cylindrical casing spaced to afford an annular receiving channel; said casing having a top provided with an axially located discharge opening, a rotary deck covering said gear box and having an axially located shaft, means for rotating said shaft, a distributing trough mounted on said rotary deck and having an inlet spout extending from the axial opening of said casing into the receiving end of said trough, said trough having at its discharge end an opening delivering into said annular receiving channel, a plurality of circumferentially spaced spouts leading downward from said annular receiving channel, a spiral conveyor working in said trough, a non-rotary beveled gear fixed below said deck concentric to the axis thereof, a shaft bearing depending from said deck, a radial shaft journaled in said bearing, a beveled pinion on the inner end of said shaft meshing with said non-rotary gear, a spur gear on the outer end of said radial shaft, a pair of intermeshing spur gears, one on the outer end of said radial shaft and the other on the outer end of the shaft of said spiral conveyor, and driving connections to the shaft of said deck for rotating the latter.

2. In a device of the kind described, the combination with a cylindrical gear box and a cylindrical casing spaced to afford an annular receiving channel, said casing having a top provided with an axially located inlet opening, a rotary deck covering said gear box and having an axially located shaft, means for rotating said shaft, a distributing trough mounted on said rotary deck and having an inlet spout extending from the axial opening of said casing into the receiving end of said trough, said trough having at its discharge end an opening delivering into said annular receiving channel, a plurality of circumferentially spaced spouts leading downward from said annular receiving channel, a conveyor working in said trough, and having a drive shaft working through one end of the trough, a non-rotary beveled gear fixed below said deck concentric to the axis thereof, a shaft bearing depending from said deck, a radial shaft journaled in said bearing, a beveled pinion on the inner end of said shaft meshing with said non-rotary gear, a spur gear on the outer end of said radial shaft, a pair of intermeshing spur gears, one on the outer end of said radial shaft and the other on the outer end of the said shaft of the conveyor, and driving connections to the shaft of said deck for rotating the latter.

3. In a device of the kind described, a rotary distributing head including a distributing trough, means for delivering material to said trough, a plurality of delivery spouts circumferentially spaced around the axis of rotation of said head and spout and arranged to receive material from said spout, under rotation of said head, a power driven feed device in said trough, an annular receiving channel into which the delivery of material from said trough is directly made and to which receiving channel the upper ends of said distributing spouts are connected, the bottom of said annular receiving channel between spouts having segmental deck sections, said distributing head having a scraper blade remote from the discharge end of said trough, arranged to sweep over the segmental deck sections under rotation of said head.

4. In a device of the kind described, a rotary distributing head having an approximately horizontally disposed distributing trough, a gear box located below said trough, an annular receiving channel surrounding said gear box in position to receive from the delivery end of said trough, a plurality of distributing spouts circumferentially spaced around said gear box and connected to the bottom of said receiving channel, a spiral conveyor in said trough, and power transmitting gears in said gear box having connections to said distributing head and to said spiral conveyor for simultaneously rotating the same.

5. The structure defined in claim 4 in which said distributing head has a bottom plate that constitutes a rotatable top to said gear box.

6. The structure defined in claim 4 in further combination with a casing extended upward from the outer portion of said annular receiving channel and provided with a dome-like top extended over said trough, and a delivery spout opening axially through said dome-like top and arranged to deliver into said trough.

ROBERT J. S. CARTER.